United States Patent [19]

Homersham

[11] 4,325,521
[45] Apr. 20, 1982

[54] HOSE LOOP CARRIER

[76] Inventor: Brian R. Homersham, 17 Victoria Park Rd., Christchurch, New Zealand

[21] Appl. No.: 183,823

[22] Filed: Sep. 3, 1980

[30] Foreign Application Priority Data

Dec. 12, 1979 [NZ] New Zealand .................. 192380

[51] Int. Cl.³ .............................................. B65H 75/40
[52] U.S. Cl. .................................................. 242/86.2
[58] Field of Search .................. 242/86.2, 86, 86.1, 242/86.3, 86.4, 86.5, 54, 76, 157

[56] References Cited

U.S. PATENT DOCUMENTS

| 3,346,213 | 10/1967 | Nelson | 242/86.2 |
| 3,504,866 | 4/1970 | Polynchek | 242/54 R X |
| 3,627,224 | 12/1971 | Diggs | 242/86.2 |
| 4,186,881 | 2/1980 | Long | 242/86.2 |

Primary Examiner—Edward J. McCarthy
Attorney, Agent, or Firm—Holman & Stern

[57] ABSTRACT

Apparatus suitable for supporting the trailable loop of an irrigation hose in an irrigation system where a hose trailing irrigator moves towards and usually past a source of water to such a trailable hose, the apparatus comprising a trailable carriage having means mounted on said carriage capable of supporting the loop off the ground and guide means capable of guiding the trailed locus of said carriage under the urging of the trailing loop. The means mounted on said carriage preferably comprises a wheel but can take other forms. The invention also consists in a method of supporting the trailed loop of an irrigation hose.

11 Claims, 11 Drawing Figures

HOSE LOOP CARRIER

BACKGROUND OF THE INVENTION

The present invention relates to an irrigation hose loop support apparatus suitable for supporting the trailable loop of an irrigation hose in an irrigation system. The apparatus takes the form of a trailable carriage capable of being guided to move along one of the lengths of hose in advance of the carriage under the influence of the moving trailed loop of hose which is supported by means mounted on said carriage. The invention also consists in the use of such apparatus.

DESCRIPTION OF THE PRIOR ART

Certain types of irrigation water distribution systems use a dragged hose as a source of water. These hoses are usually of the lie flat type and have to be laid out in the irrigation area for their full length from a hydrant. In operating a typical travelling irrigator which is commonly driven by the water passing through the hose there is a continuous 180° loop in the dragged hose. Depending on the hose diameter and design there are manufacturer specified operating pressures above which the hose will not kink at the bend. As a general guide however such pressures range from 50 to 70 psi which are pressures which require a significant degree of energy input. In designing irrigation water distribution schemes for energy saving lower pressures are required with the result that hose kinking will occur. One such lower pressure irrigation is that disclosed in our New Zealand Patent Specification No. 190260, the full disclosure of which is herein incorporated by way of reference. Hose kinking adds of course to the pressure loss in the hose and since it also forms a knuckle or corner in the hose additional localised abrasion and water results.

With certain crop types also a drag hose causes some degree of crop damage along the locus of the 180 degree loop and it is therefore desired if possible to minimise such damage while at the same time to avoid kinking in the hose even at low pressures of for example 10 to 25 psi.

While apparatus has been proposed in some countries to support a loop of a hose at substantially higher pressures no fully satisfactory means has been provided and certainly no means for such a purpose has been provided which includes means to ensure guidance of both the loop and the apparatus supporting the same. It is therefore an object of the present invention to provide means and/or methods which will go at least some way towards meeting the abovementioned desiderata or which will at least provide the public with a useful choice.

BRIEF SUMMARY OF THE INVENTION

In one aspect the present invention consists in an irrigation hose loop support apparatus suitable for supporting the trailable loop of an irrigation hose in an irrigation system where a hose trailing irrigator moves towards and usually past a source of water to such a trailed hose, said support apparatus comprising a trailable carriage, means mounted on said carriage capable of receiving such a hose from a direction substantially in which said carriage is trailable, supporting the loop of said hose and allowing the return of said hose in a direction also substantially in the direction in which said carriage is trailable, said means being capable of allowing upon the pulling of the length of said hose in use in advance of said carriage to said irrigator, the movement of the hose of the loop about and or through said means, and guide means capable of guiding the trailing locus of said carriage from at least one of the lengths of hose of said hose in advance of said carriage with respect to its trailable direction.

Preferably said means mounted on said carriage capable of receiving such a hose from a direction substantially in which said carriage is trailable, supporting the loop of said hose and allowing the return of said hose in a direction also substantially in the direction in which said carriage is trailable comprises wheel means capable of rotating relative to said carriage to move with the hose as said hose is guided about hose receiving means at or towards the rim of said wheel means.

Preferably said wheel means is mounted so that the rotational axis thereof is inclined forwardly of the vertical having regard to the direction of travel of said trailable carriage in use.

Preferably said means dependent from said carriage but not said wheel means is disposed to either side of said wheel means with respect to the trailable direction and in advance at least of the transverse diametral extent of said wheel means also with respect to the trailable direction arranged to ensure in use hose contacts at least half of the circumferential extent of said receiving means at or towards the rim of said wheel means.

Preferably said guide means comprises means at or about the distal end of an arm member which said means are slidably or rotationally capable of following a laid out length of hose and which arm is capable of steering said trailable carriage.

Preferably there are two wheels and said guide means comprises means at or about the distal end of an arm capable of straddling and following a laid out length of hose and which arm in use, despite said guide means being substantially at a non-right angled vertex of a right angled triangle formed by said guide means and said two wheels, is capable of steering said trailable carriage.

Preferably said arm can be adjusted to form two right angled triangles, one for following hose substantially to the left of said trailable carriage and the other for following hose substantially to the right of said trailable carriage.

In a further aspect the invention consists in a method of irrigation of a kind wherein a hose trailing irrigator trails a loop of hose, the other end of which is fixed to a source of water such as a hydrant, passed which the irrigator can if desired travel but passed which the trailed loop does not follow, the irrigator distributing water being passed through said hose by a method of reducing damage (to hose and/or crop) due to the dragging of said loop of hose along the ground comprising employing an irrigation hose loop support apparatus in accordance with the present invention such that the loop of the hose is supported by said means mounted on said carriage capable of receiving such hose from the direction substantially in which said carriage is trailable, supporting the loop of said hose and allowing the return of said hose in a direction also substantially in the direction in which said carriage is trailable and ensuring said guide means will steer said trailable carriage and the carried loop from a length of said hose in advance of the trailable carriage such that the loop as it incrementally changes in its position along the hose is continued to be carried thereby and at the same time causes the carriage to advance as the irrigator advances.

Preferably guide means is arranged to move over the length of hose between said travelling irrigator and said irrigation hose loop support apparatus. Preferably said hose is a lie flat type hose.

BRIEF DESCRIPTION OF THE DRAWINGS

One preferred form of the present invention will now be described with reference to the accompanying drawings in which FIG. 2C is a similar arrangement to that of FIG. 2B showing the preferred angle axis of rotation which tilts forward in the direction of travel, ie the direction from which the hose passes from and from which it leaves after passing around the wheel in order to enhance the natural catenary of the hose and lift the same clear of crops and the like also thereby minimising kinks and wear in the hose.

DETAILED DESCRIPTION OF THE INVENTION

In the preferred form of the present invention it is envisaged that the water pressure at the hydrant which is preferably one of several fixed hydrants disposed about a farm of the like would be 20 to 25 psi. With an appropriate lie flat hose of an average length, it is envisaged that the water pressure at any spray heads would be approximately 10 psi. With such low pressures therefore it is desirable to take positive steps in order to minimise kinks etc and with this in mind of course the present invention has been devised.

The apparatus in accordance with the present invention is for use with a conventional trailed loop irrigation system substantially as described previously with reference to FIGS. 1A to 1C. With such a system it can be seen that there will be a certain measure of crop damage and there will certainly be wear at the loop as it is kinked.

Figure 3:
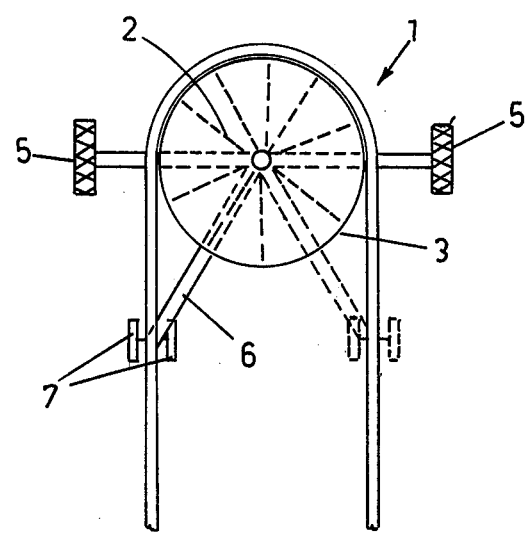
FIG. 3 is a plan view of the preferred arrangement as shown in FIG. 2C showing an arm extending slightly offset from the line of advancement that passes through the axis of rotation of said wheel, said arm having at the distal end thereof means (preferably dual wheels) which straddles the hose to thus guide the carriage and the apparatus as a whole.
Figure 2B:
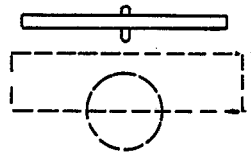
FIG. 2B is a similar view to that of FIG. 2A but showing a wheel for the hose with substantially a verticle axis of rotation.
Figure 4:
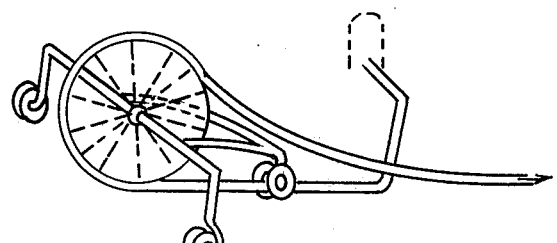
FIG. 4 is an alternative form i.e. one such as denoted in FIG. 2A but showing how while both forward expanses of hose (if not in advance of the hydrant) can be straddled a hose cross over point occurs over which the travelling irrigator but not the carriage of the transfer wheel must cross, and this may require protection such as with a gull-wing plate, for example.
Figure 2A:
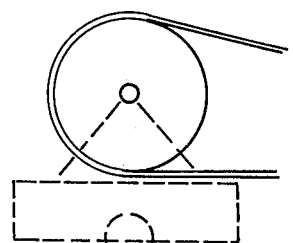
FIG. 2A is a diagramatic side elevation view showing a hose going to and from a wheel or the like mounted from a carriage (shown in dotted outline), the wheel having a substantially horizontal axis of rotation.

The feature of the present invention is to provide a substantially freely rotatable and undriven wheel or other hose supporting means on a trailable carriage which does not receive itself for any irrigation purposes any of the water from the hose. For this purpose any of the modes shown in FIGS. 2A to 2C or even FIGS. 6 and 7 could be used, ideally however that shown in FIG. 2C is employed and the preferred arrangement is substantially as shown in FIG. 3 where there is the carriage 1 itself having a slightly tilted forward axis of rotation 2 about which the substantially freely rotatable wheel rotates. Around this wheel over substantially 180 degrees of the circumference thereof the hose 4 is trailed. The carriage of the rotatable wheel preferably includes two wheels or the like 5 in order to reduce energy needs in trailing the same. If desired however, a saddle skid, skids, 19 or idlers could be used in place of wheels 5. If desired, provisions can be made for adjusting the width of the wheels, or alternate means, so as to deal with different row crop separations. Without any steerage of such an arrangement however a considerable degree of difficulty would be encountered owing to one or the other of the wheels 5 hitting a minor or significant obstruction, skewing the carriage and thus leading to unnecessary drag on the travelling irrigator or causing the hose 4 to slip from around the wheel 3 and to thus defeat the purpose of the present invention. To overcome this difficulty a steering arrangement is provided and preferably this involves means capable of guiding itself on one of the expanses of hose in advancement of the carriage preferably that portion under the greater tension, i.e. from the travelling irrigator to the wheel is used as it provides the more positive steerage. It is of course conceivable that the other length could be used (see FIG. 3) and for this reason it is desirable that the arm or the like 6 from which the straddling means 7 is provided should be capable of some degree of adjustment. Of course with different runs from different hydrants it may be appropriate to make such a simple adjustment and for this purpose it is desirable that the arm 6 be readily adjustable as to its degree and direction of offsetting.

Figure 5:
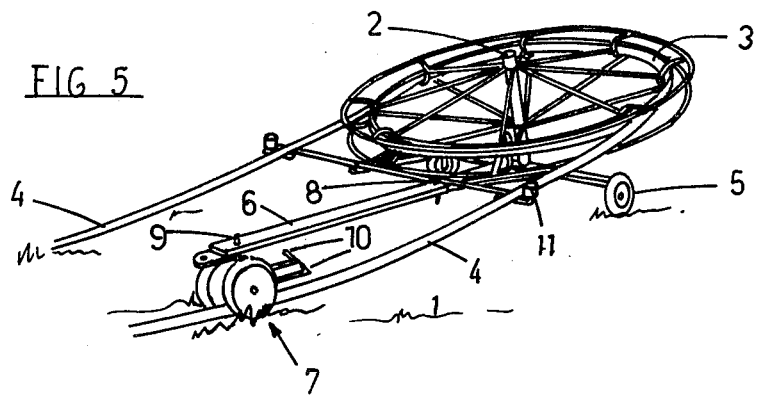
FIG. 5 is a perspective view of preferred apparatus in accordance with the present invention showing the straddling guidance wheels which are preferably capable of being freely swivelled at the distal end of the guiding arm.

Turning to the preferred form of the present invention shown in FIG. 5 similar reference numerals to those shown in FIG. 3 are employed. It can be seen that in the preferred form of the present invention some pin or the like arrangement 8 is all that is necessary to fix the degree of offsetting of the distal end of the arm 6. Preferably however the dual wheels which are the preferred straddling device of the hose are pivoted freely by a pivot 9 to better the steering.

Figure 1A:
FIG. 1A shows a diagramatic plan view showing the fixed hydrant, a travelling irrigator substantially at one limit of its hose but with the wheel or other means of apparatus in accordance with the present invention supporting the trailed loop of the hose, the direction in which the travelling irrigator is to travel being denoted by the arrow.
Figure 1B:
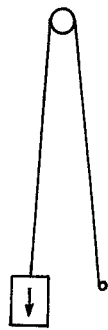
FIG. 1B shows the same arrangement as in FIG. 1A but after the travelling irrigator has travelled substantially the full length of its hose and continue onwards (unless stopped) passed the fixed hydrant, it being seen that the trailable apparatus which is travelling substantially at half the speed of the travelling irrigator moves in substantially the same direction.
Figure 1C:
FIG. 1C is a similar view to that of FIGS. 1A and 1B but showing the travelling irrigator at a preferred limit of its movement in its passage with the trailable apparatus of the present invention stopping just short of the fixed hydrant.

In the preferred form of the present invention the axle of such wheels 7 preferably includes means 10 capable of engaging with an end connection of the hose 4 so that at the end of a run or at any other time if desired such an end connection can be engaged therewith so that when the hose is retrieved prior to moving to a new hydrant the apparatus shown in FIG. 5 can trail therebehind thereby minizing time and labor during any such change over. Alternatively, if desired some towbar could be provided on the apparatus as shown in FIG. 5 away from the arm 6 so that the hose is trailed behind the apparatus should the apparatus be towed. Of course such a towbar would be useful in retracting a travelling irrigator from its condition as shown in FIG. 1C to the condition as shown in FIG. 1A.

FIG. 5 also shows rollers or the like means 11 (preferably a series of them) adapted to contain the hose and hold the same firmly about the skeletally channel rimmed wheel 3. Persons skilled in the art will appreciate the various means of construction for such an arrangement and how the apparatus can be readily modified in order to further minimise any question of wear on a hose.

It should be realised that the wheels of the carriage and/or guiding means can be replaced by skids.

Figure 6:
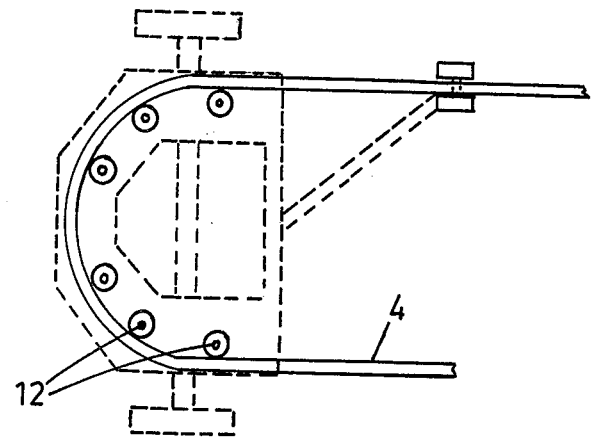
FIG. 6 is a plan view of an alternative form of apparatus showing how the means mounted from said carriage to support the hose loop and to allow the receiving of the same from in advance of the carriage and allow the return thereof also in advance of the carriage could instead of the preferred support wheel assume the form of a plurality of conforming and supporting rollers.
Figure 7:
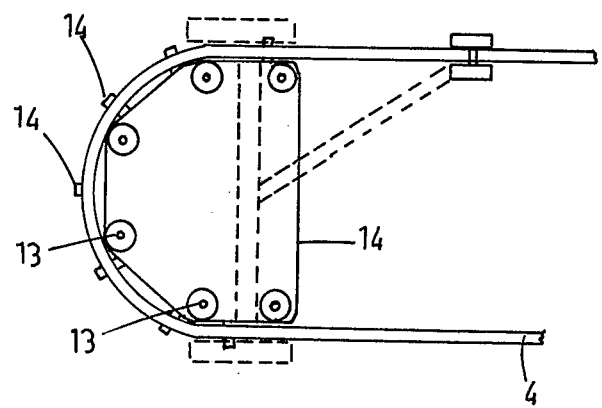
FIG. 7 is a similar view to that of FIG. 6 but showing how instead if desired the means for supporting the hose could take the form of sprocket or roller supported endless conveyor means which moves around a plurality of supporting rollers or sprockets as the case may be and in so doing minimizes the scuffling of the hose as the same moves therearound while the loop proper is supported on a plurality of substantially horizontally or even vertically disposed rollers.

Turning to FIG. 6 and to FIG. 7 it can be seen that the apparatus of the present invention need not have a wheel as such as the hose supporting means. FIG. 6 for instance shows the hose 4 passing about a plurality of hose conforming and supporting rollers 12. Preferably such rollers are provided with a profile whose contacting surface provides some degree of vertical support therefor. Alternatively idle rollers with substantially horizontal rotational axis could be provided to act in conjunction with rollers 12 in order to provide the degrees of support needed. FIG. 7 shows an alternative to the form shown in FIG. 6 and here sprockets or rollers 13 support an endless chain or belt as the case may be which minimises the scuffing of the hose as it passes around such means. With such an arrangement preferably a plurality of idle rollers 14 are provided to lend the appropriate vertical support to the hose loop.

From the foregoing then it can be seen that with a simple two wheeled carriage and a steerage arrangement wheeled or otherwise the natural catenary of the hose can be easily catered for. Persons skilled in the art will appreciate how the preferred forms of the present invention with the offsetting minimise any question of crossed hose and the like.

It is envisaged that the apparatus of the present invention will be used with a travelling irrigator substantially of the kind envisaged in our New Zealand Patent Specification No. 190620.

From the foregoing persons skilled in the art will appreciate that the present invention embodies the following advantages:

1. for low pressure operation of lie flat hoses there is sufficient loop control of the hose to avoid kinking even at low pressures such as 10 psi where any such kinking would pulsate the flow and significantly decrease the flow and pressure of water to the travelling irrigator.
2. crop damage by dragging the hose loop is substantially eliminated.
3. hose life is extended by eliminating the extra abrasion resulting from dragging a loop or dragging a kinked hose,
4. the hose transfer wheel, as the apparatus of the present invention can be called, permits extra low hose pressure operation and thereby extends hose life on that basis, and
5. raising the hose loop reduces overall energy usage in the system due to reduction in hose drag.

What is claimed is:

1. An irrigation hose loop support apparatus suitable for supporting the trailable loop of an irrigation hose in an irrigation system where a hose trailing irrigator moves towards and usually past a source of water to such a trailed hose, said support apparatus comprising
   a trailable carriage,
   means mounted on said carriage capable of receiving such a hose from a direction substantially in which said carriage is trailable, supporting the loop of said hose and allowing the return of said hose in a direction also substantially in the direction in which said carriage is trailable, said means being capable of allowing upon the pulling of the length of said hose in use in advance of said carriage to said irrigator, the movement of the hose of the loop about and or through said means, and
   guide means capable of guiding th trailing locus of said carriage from at least one of the lengths of hose of said hose in advance of said carriage with respect to its trailable direction.

2. Apparatus as claimed in claim 1 wherein said means mounted on said carriage capable of receiving such a hose from a direction substantially in which said carriage is trailable, supporting the loop of said hose and allowing the return of said hose in a direction also substantially in the direction in which said carriage is trailable comprises wheel means capable of rotating relative to said carriage to move with the hose as said hose is guided about hose receiving means at or towards the rim of said wheel means.

3. Apparatus as claimed in claim 2 wherein said wheel means is mounted so that the rotational axis thereof is substantially vertical or inclined forwardly of the vertical having regard to the direction of travel of said trailable carriage in use.

4. Apparatus as claimed in claim 3 wherein means dependent from said carriage but not said wheel means is disposed to either side of said wheel means with respect to the trailable direction and in advance at least of the transverse diametral extent of said wheel means also with respect to the trailable direction arranged to ensure in use hose contacts at least half of the circumferential extent of said receiving means at or towards the rim of said wheel means.

5. Apparatus as claimed in claim 1 wherein said guide means comprises means at or about the distal end of an arm member which said means are slidably or rotationally capable of following a laid out length of hose and which arm is capable of steering said trailable carriage.

6. Apparatus as claimed in claim 1 wherein said trailable carriage is provided with at least two wheels.

7. Apparatus as claimed in claim 3 wherein there are two wheels and said guide means comprises means at or about the distal end of an arm capable of straddling and following a laid out length of hose and which arm in use, despite said guide means being substantially at a non-right angled vertex of a right angled triangle formed by said guide means and said two wheels, is capable of steering said trailable carriage.

8. Apparatus as claimed in claim 7 wherein said arm can be adjusted to form two right angled triangles, one for following hose substantially to the left of said trailable carriage and the other for following hose substantially to the right of said trailable carriage.

9. In a method of irrigation of a kind wherein a hose trailing irrigator trails a loop of hose, the other end of which is fixed to a source of water such as a hydrant, passed which the irrigator can if desired travel but passed which the trailed loop does not follow, the irrigator distributing water being passed through said hose a method of reducing damage due to the dragging of said loop of hose along the ground comprising employing an irrigation hose loop support apparatus comprising a trailable carriage, means mounted on said carriage capable of receiving such a hose from a direction substantially in which said carriage is trailable, supporting the loop of said hose and allowing the return of said hose in a direction also substantially in the direction in which said carriage is trailable, said means being capable of allowing upon the pulling of the length of said hose in use in advance of said carriage to said irrigator, the movement of the hose of the loop about and or through said means, and guide means capable of guiding the trailing locus of said carriage from at least one of the lengths of hose of said hose in advance of said carriage with respect to its trailable direction, the employment of such apparatus being such that the loop of the hose is supported by said means mounted on said carriage capable of receiving such hose from the direction substantially in which said carriage is trailable, supporting the loop of said hose and allowing the return of said hose in a direction also substantially in the direction in which said carriage is trailable and ensuring said guide means will steer said trailable carriage and the carried loop from a length of said hose in advance of the trailable carriage such that the loop as it incrementally changes in its position along the hose is continued to be carried thereby and at the same time causes the carriage to advance as the irrigator advances.

10. A method as claimed in claim 9 wherein said guide means is arranged to move over the length of hose between said travelling irrigator and said irrigation hose loop support apparatus.

11. A method as claimed in claim 9 wherein said hose is a lie flat type hose.

* * * * *